(12) United States Patent
Acharya et al.

(10) Patent No.: US 9,189,525 B2
(45) Date of Patent: Nov. 17, 2015

(54) METHODS AND SYSTEMS FOR GENERATING AUTOMATED TAGS FOR VIDEO FILES

(71) Applicant: Limelight Networks, Inc., Tempe, AZ (US)

(72) Inventors: Soam Acharya, San Bruno, CA (US); David Bargeron, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 321 days.

(21) Appl. No.: 13/775,367

(22) Filed: Feb. 25, 2013

(65) Prior Publication Data

US 2013/0212113 A1 Aug. 15, 2013

Related U.S. Application Data

(63) Continuation of application No. 13/245,840, filed on Sep. 26, 2011, now Pat. No. 8,396,878, which is a continuation-in-part of application No. 11/903,279, filed on Sep. 21, 2007, now Pat. No. 8,966,389.

(60) Provisional application No. 60/846,484, filed on Sep. 22, 2006.

(51) Int. Cl.
*G10L 15/26* (2006.01)
*G06F 17/30* (2006.01)

(52) U.S. Cl.
CPC ...... *G06F 17/3053* (2013.01); *G06F 17/30796* (2013.01); *G06F 17/30817* (2013.01); *G06F 17/30843* (2013.01)

(58) Field of Classification Search
CPC .......... G06F 17/3053; G06F 17/30817; G06F 17/30843
See application file for complete search history.

(56) References Cited

U.S. PATENT DOCUMENTS

| | | | |
|---|---|---|---|
| 6,199,076 B1 * | 3/2001 | Logan et al. ................. 715/203 |
| 6,782,394 B1 | 8/2004 | Landeck et al. |
| 7,542,969 B1 * | 6/2009 | Rappaport et al. .................... 1/1 |
| 7,680,853 B2 | 3/2010 | Yu et al. |
| 2003/0004942 A1 * | 1/2003 | Bird ................................. 707/3 |
| 2004/0152055 A1 * | 8/2004 | Gliessner et al. ............. 434/169 |
| 2006/0053364 A1 * | 3/2006 | Hollander et al. ............. 715/512 |

(Continued)

OTHER PUBLICATIONS

International Search Report and Written Opinion dated Feb. 26, 2013 for International PCT Application No. PCT/US2012/057146, 11 pages.

*Primary Examiner* — Tarek Chbouki (74) *Attorney, Agent, or Firm* — Kilpatrick Townsend & Stockton, LLP (57) ABSTRACT

Techniques for generating automated tags for a video file are described. The method includes receiving one or more manually generated tags associated with a video file, based at least in part on the one or more manually entered tags, determining a preliminary category for the video file, and based on the preliminary category, generating a targeted transcript of the video file, wherein the targeted transcript includes a plurality of words. The method further includes generating an ontology of the plurality of words based on the targeted transcript, ranking the plurality of words in the ontology based on a plurality of scoring factors, and based on the ranking of the plurality of words, generating one or more automated tags associated with the video file.

19 Claims, 7 Drawing Sheets

(56) References Cited

U.S. PATENT DOCUMENTS

| | | | |
|---|---|---|---|
| 2007/0074116 A1* | 3/2007 | Thomas | 715/719 |
| 2007/0288518 A1* | 12/2007 | Crigler et al. | 707/104.1 |
| 2008/0046406 A1* | 2/2008 | Seide et al. | 707/3 |
| 2009/0083256 A1 | 3/2009 | Thompson et al. | |
| 2010/0169786 A1* | 7/2010 | O'Brien et al. | 715/738 |
| 2010/0198835 A1* | 8/2010 | Sorvari et al. | 707/748 |
| 2010/0223223 A1 | 9/2010 | Sandler et al. | |
| 2011/0225136 A1 | 9/2011 | Tu et al. | |

\* cited by examiner

METHODS AND SYSTEMS FOR GENERATING AUTOMATED TAGS FOR VIDEO FILES

CROSS-REFERENCES TO RELATED APPLICATIONS

This application is a continuation of application Ser. No. 13/245,840, filed Sep. 26, 2011, which is a continuation-in-part of U.S. application Ser. No. 11/903,279, filed Sep. 21, 2007, which claims the benefit and priority of U.S. Provisional Application No. 60/846,484, filed Sep. 22, 2006. Each of the above-listed application is hereby incorporated by reference in its entirety for all purposes.

BACKGROUND

Presently, tagging (or categorizing) video content uses a heavily manual documenting process which provides limited, inadequate, and sometimes inaccurate results. Such manual tagging requires that the individual providing the tag information has correctly tagged the video or properly determined the category of the video. Currently, some ways to tag videos include entering metadata manually or using information gathered from databases describing the content to be tagged. Additionally, closed captioning information can also be searched for keywords which can also be used to determine tags.

Furthermore, with regard to searching video content, such searching is limited to keywords from, for example, the closed captioning transcripts or the manually formulated metadata, and both of these methods are inefficient, not flexible, and tend to not provide complete search results. Further, scoring of results might be based upon matches between a search string and the metadata, but both such searching methods result in bad or incomplete search results.

Also, regarding providing related video, there are widgets that exist to suggest related videos which only match the metadata, possibly by popularity. Again, because the results based on metadata are flawed for the above reasons, the related video based on such metadata is similarly flawed.

Additionally, there exists a need for improvements in the art. For example, in recent years, there has been an increased demand for archived video content (i.e., TV shows, sporting events, classic movies, etc.) which have yet to be tagged and categorized. Due to the fact that the tagging process is currently manually intensive, the workload of attempting to tag all the archived videos is too high. As a result, a significant revenue stream for owners of such content is curtailed. Hence, improvements in the art are needed.

BRIEF SUMMARY

In one embodiment, a method of generating automated tags for a video file is described. The method includes receiving one or more manually generated tags associated with a video file, based at least in part on the one or more manually entered tags, determining a preliminary category for the video file, and based on the preliminary category, generating a targeted transcript of the video file, wherein the targeted transcript includes a plurality of words. The method further includes generating an ontology of the plurality of words based on the targeted transcript, ranking the plurality of words in the ontology based on a plurality of scoring factors, and based on the ranking of the plurality of words, generating one or more automated tags associated with the video file.

Furthermore, the plurality of scoring factors include one or more of: frequency of words, proximity of words relative to other words, distribution of words throughout the targeted transcript of the video file, words related to the plurality of words throughout the targeted transcript of the video file, occurrence age of the related words, information associated with the one or more manually entered tags, vernacular meaning of the plurality of words, or colloquial considerations of the meaning of the plurality of words.

The method further includes determining if the rankings for each of the plurality of words exceed a threshold ranking value and excluding any of the plurality of words that has a ranking value lower than the threshold value. Furthermore, the method includes determining a score for each of the plurality of words, wherein the score includes word frequency, word distribution, and word variety, and generating a heat map for the video file, wherein the heat map comprises a graphical display which indicates that offset locations of words within the video file with the highest rankings.

Further, the method includes cross-referencing words with the plurality of words to determine correlations between words or to construct phrases. The cross-referencing of the word or words is configured to increase the ranking of the word or words. Further, the method includes establishing a top concepts threshold value, determining that one or more of the rankings of the plurality of words exceeds the top concepts threshold, and associating information about the one or more of the plurality of words with rankings that exceed the top concepts with the video file to designate the top concepts of the video file.

Furthermore, the ontology is configured to provide categorical models of the plurality of words. Further, the video file includes an associated audio file, and the targeted transcript comprises the plurality of words extracted from the audio file, and each of the plurality of words has an associated offset value which designates the occurrence position of each word within the video file. The method also includes receiving a second video file, receiving one or more manually generated tags associated with the second video file, based at least in part on the one or more manually entered tags associated with the second video file, determining a preliminary category for the second video file, and based on the preliminary category of the second video file, generating a targeted transcript of the second video file. The targeted transcript of the second video file includes a second plurality of words generating an ontology of the second plurality of words based on the targeted transcript of the second video file.

Furthermore, the method includes ranking the plurality of words and the second plurality of words based on the plurality of scoring factors and, based on the ranking of the plurality of words and the second plurality of words, generating one or more automated tags associated with both the video file and the second video file.

In an alternative embodiment. a method of tagging one or more video files is described. The method includes receiving a list of candidate tags for a video file, receiving a transcript of audio associated with the video file, and ranking the list of candidate tags for the video file based on a plurality of ranking factors. Further, the method includes filtering candidate tags from the list of candidate tags which rank below a threshold value, presenting the filtered list of candidate tags in a user interface, and receiving a selection of one or more of the filtered list of candidate tags. Furthermore, the method includes evaluating the transcript and producing an updated list of candidate tags for the video file.

The method further includes, based on the updated list of candidate tags, providing suggested video files associated with the video file, receiving a plurality of concepts and a heat map for one or more video files, correlating the heat map and plurality of concepts for each of the one or more video files to determine multiple areas of activity within the one or more video files, cutting the one or more video files at each of the areas of activity into a plurality of cut portions of the one or more videos, and assembling the plurality of cut portions of the one or more videos into a single abridged video file.

In a further embodiment, a method of providing results from word searching inside of a video file is described. The method includes adjusting the cuts based on scene breaks within the one or more video files, and fading in and out between each of the plurality of cuts of the abridged video file. Further, the method includes receiving a heat map for a video file, associating each word within the video file with a time offset occurrence, receiving a search criteria, comparing the search criteria with each word, identifying words which match the search criteria, and based on the associated time offset occurrence of each of the identified words, displaying each occurrence of each matching word.

Furthermore, the display includes displaying the video file in a video player with an associated time bar, and the display of each occurrence of each matching word is represented by a graphical element along the time bar relative to the location within the video at the associated time offset occurrence. Further, the method includes providing a graphical search box configured to receive the search criteria.

In yet another embodiment, a computer-readable medium is described. The computer-readable medium includes instruction for receiving one or more manually generated tags associated with a video file, based at least in part on the one or more manually entered tags, determining a preliminary category for the video file, and based on the preliminary category, generating a targeted transcript of the video file. The targeted transcript includes a plurality of words. The computer-readable medium further includes instructions for generating an ontology of the plurality of words based on the targeted transcript, ranking the plurality of words in the ontology based on a plurality of scoring factors, and based on the ranking of the plurality of words, generating one or more automated tags associated with the video file.

Furthermore, the computer-readable medium includes instructions for generating a web page which includes an embedded widget, based on the one or more automated tags searching web content to return a list of videos, blogs, audio, and web pages that matches the one or more automated tags, and providing within the widget a view of each of the returned results.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the figures, similar components and/or features may have the same reference label. In some cases, components of the same type are identified by following a first reference label with a dash and a second reference label that further distinguishes among the similar components. If only the first reference label is used, the description is applicable to any of the similar components designated by the first reference label.

DETAILED DESCRIPTION OF EMBODIMENTS

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Aspects of the present invention relate to the use of a relevancy engine to automatically suggest tags for video(s). In one embodiment, transcripts, word and phrase weighting, and ontology may be used to match text gathered from video or audio sources to map to metadata. For example, significant (or relevant) words may be found from a transcript that can be used directly as metadata or to signal another metadata word to use. How rare and how spread out words and groups of words occur may be used to score terms that are important to the weighting algorithm. Furthermore, the algorithm may be used to find top concepts (and other useful information) found to map those to, for example, publisher supplied metadata categories.

In a further embodiment, weighting of a heat mapping algorithm may be used to find where particular concepts are likely to appear. Presenting a video and a video category may return a list of scored top concepts. This process may involve using language models to extract a transcript from the video file. Subsequently, intersecting the transcript and the ontology(s) developed for that category may be used to extract a sequence of candidate concepts. Then, those concepts may be ranked according to a number of metrics (i.e., how the concepts are distributed throughout the video, etc.). Finally, a scored list of concepts exceeding a set threshold may be returned.

In yet another embodiment, once a list of top concepts for a video file is obtained, a determination of the "hot spots" in the video file where such concepts are predominant may be made. Accordingly, a second video may be transcoded from the original video which is solely inclusive of the "hot spots". Subsequently, an automatic summary of the video into a condensed abstract form that includes all the snippets that are considered to be relevant may be generated. Furthermore, fade of, for example, 10 seconds before each snippet and 10 seconds after each snippet may be used when putting the snippets in the abridged video file together. Alternatively, an increase or decrease of time may be used depending on the length of the snippets and the number of snippets being used. Furthermore, fade can be skipped for certain snippets to produce larger snippets. Additionally, multiple videos may be used to create an abridged video compiled from the multiple videos.

In a further embodiment, a search keyword may be inputted in order to classify that keyword and then to obtain related concepts. For example, using keyword and keyword concepts to obtain an initial list of videos where either a) a search of the keyword matches the transcript of a video file or b) the keyword concept matches top concepts associated the video file. Further, use of a "search inside" technique on each video in the initial list can be used to generate a heat map vector. In one embodiment, the "search inside" techniques allows for the searching of words and terms within a video file to produce a display of the locations of each occurrence of the searched words or terms. Furthermore, use of the vector to generate a new search score for each video can be accomplished. As such, a re-ranking and return of videos according to the new search score occurs. Then, a compilation of all the hot spots from multiple videos can be generated, and could then be added to the transcript OCR from video such as credits, signs, title, etc.

In yet another embodiment, a user interface for a site-wide search to display video search results may be provided. Instead of generating a list of videos and heat maps in response to a search query, a single video that, in effect, is an on-the-fly compilation of the hot spots of all of the videos comprising the search results may be generated. This creates a single abstract of many snippets from many videos, which can be easily searched for references to particular topics of interest.

In another embodiment, a widget (or the like) that provides a web page including the embedded widget may be created. As such, the top concepts from the page and returned list of videos whose top concepts best match the top concepts from that page may be presented. Accordingly, the top concepts from the page are extracted using techniques similar to those used to extract top concepts. In one embodiment, result algorithms may be a function of matching metadata, exact or similar terminology in the video and/or popularity of the video. For example, a web page on "horses" may include suggested other videos on horses, mules, or ponies.

Figure 1:
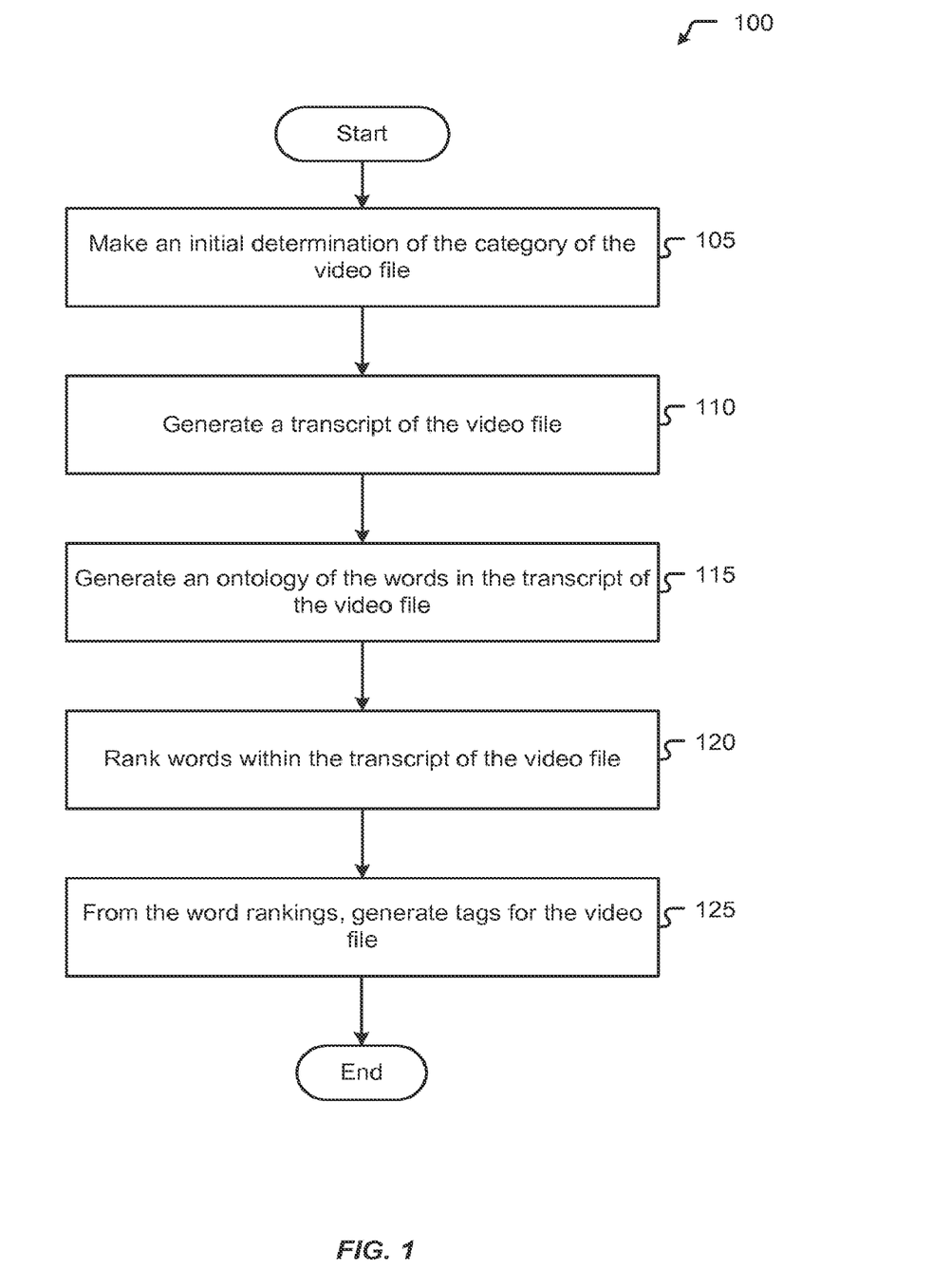
FIG. 1 shows a method of ranking words in a video file and generating tags associated with the video file.

Referring first to FIG. 1, a method 100 of ranking words in a video file and generating tags associated with the video file is shown. At process block 105, an initial determination of the category of a video file is made. In one embodiment, the initial determination may be made based on user provided or system provided tags (i.e., a "tag" is data and metadata which identifies a video file for searching and other identification purposes). Also, historical search and view data may also assist in making the initial determination of the video's category.

At process block 110, a targeted transcript of the video file is generated. In one embodiment, the video file may have an associated audio file or audio encoring which includes the audio associated with the video (e.g., voice, music, sound effects, etc.). The transcript may then include the dialogue and other words found within the audio file. In a further embodiment, the targeted aspect of the transcript includes enhancing the transcript by first understanding the category of the video file to produce a more targeted transcript. For example, because of variations in speech, inflection, accents, etc., producing an accurate transcript of an audio file can be difficult. However, if the category of the video file was known to the system prior to generating a transcript, a more accurate and more intelligent transcript would be produced. In one example, if the category is "a football telecast", then the system can be tuned to be listening for terms associated with football (i.e., touchdown, pass, quarterback, etc.). Whereas, if the system identified 'touch' and 'down' in succession, then the system could make the determination that the speaker is actually saying 'touchdown' as opposed to two separate words, thus producing a more accurate transcript (hence a 'targeted' transcript).

Furthermore, at process block 115, an ontology of the words found within the transcript may be generated. In one embodiment, the ontology may provide a categorical model of the transcript. For example, the ontology can be used to represent knowledge as a set of concepts within the video file and the relationships between those concepts. It can be used to reason about the entities, topics, etc. within that video file, and may be used to describe the video file itself. Accordingly, the ontology of the transcript can be further used to "tune" the understanding of the content of the video file.

At process block 120, the words within the transcript may be ranked. In one embodiment, the ranking may be based on a tf-idf score (i.e., term frequency-inverse document frequency). This tf-idf score is a statistical measure used to evaluate how important a word is to a document or collection of documents. The importance may also be offset by the frequency of the word. Furthermore, words that occur "too" frequently (e.g., "the", "an", "a", "and", etc.) may be ranked lower based on a high frequency. Also, infrequent words, such as a proper name or the like, may be ranked higher due to their unique importance to the overall transcript.

One additional consideration may include the relative volume of the words, as the louder a word is spoken in the context of the video, the more significant it may be. For example, in a sporting event, a commentator yelling about a play, may indicate that the words the commentator is using have more significance.

Additionally, the distribution of a word may contribute to its score. For example, if a word is spread throughout the transcript, it may be ranked higher, and similarly, if a work is clustered in a few places throughout the transcript, it may also be ranked higher. For example, if the word "down" is found throughout the transcript, it may have an increased rank, and then higher ranked words may be further analyzed to determine associated words. As such, since "down" is ranked highly, the words "first", "second", "third", and "fourth" in connection with down may be ranked higher as well. This determination would also assist in a further understanding of the category of the video file (i.e., a football game). Furthermore, based on such word distribution, a "heat map" for the video file may be generated. Thus, words that appear "close together" may increase the ranking of all or some of the words in the grouping.

Another consideration when ranking words within the transcript is to find words related to the ranked words to determine if any correlations exist. In other words, those words that are able to "connect" other words together. For example, in the context of a football game, "Denver" and "Broncos" may be related words. Whereas, alone "Denver" is simply a location in Colorado, and "Broncos" are simply animals, the related words "Denver Broncos" provide a higher ranking of the combination of the two words than just the words by themselves. In a further example, the words "touchdown" and "running back" may be significant, but after the relationship of "football game" is determined, then "touchdown" and "running back" become more significant and as such receive a higher ranking.

Furthermore, in one embodiment, each of the aforementioned considerations may be considered "passes" at the transcript to provide more and more tuned rankings for the words. For example, at the first pass, a number of words may receive an initial rank based on their tf-idf score, but then at a second pass may consider the frequency of the words, and subsequently a third pass may consider distribution of words, then a fourth pass may consider related words, and so forth. Alternatively, any of these scoring/weighting considerations may be done in parallel or in a different order, etc. Ultimately, a word ranking determination may be generated considering all or some of the following factors: frequency, proximity, distribution, relations of words, age of related words, tagging data as entered, etc.

At process block 125, based on the word ranking, tag(s) may be generated for the video file. Such tags are configured to better represent the content of the video file as well as provide tags to previously un-tagged videos. Furthermore, the tags can be used to represent "top concepts" of the video file, as well as provide relationships between multiple videos and categorize multiple videos.

Figure 2:
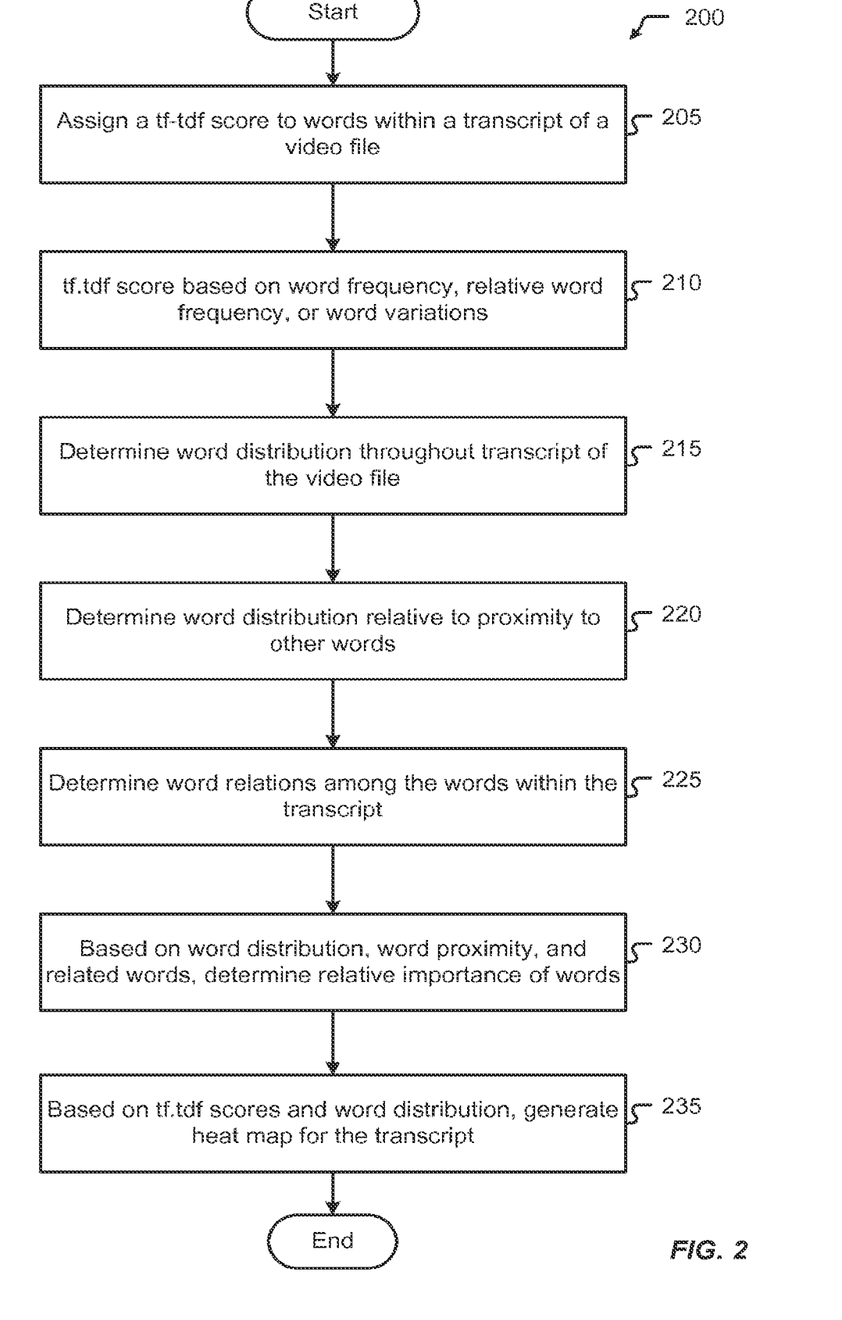
FIG. 2 shows a method of generating a heat map for a given video file.

Turning now to FIG. 2, a method 200 of generating a heat map for a given video file is shown. At process block 205, based at least in part on the method 100, tf-tdf scores may be assigned to each of the words occurring in a video file transcript. In one embodiment, the tf-tdf scores may be based on word frequency, relative word frequency, word variations, etc. (process block 210).

At process block 215, word distribution is determined for each word, word distribution relative to related words is also determined (process block 220), and word relations among the words within the transcript are also determined (process block 225). Accordingly, based on all of these determinations, the relative importance of the words within the transcript of the video file may be determined (process block 230).

Accordingly, based on the distribution and the importance of the words, a heat map for the video file may be generated (process block 235). In one embodiment, a heat map may include a graphical representation of the distribution of words based on the "location" of the occurrence of the word within the video file, as well as the relative importance of the words. For example, the "location" of the word may be based on a time offset of the occurrence of the word, such that if the video is displayed in a video player which includes a "time bar", then wherever the word occurs may be graphically represented at the location of its occurrence. Furthermore, the more important a word is or the more important words are occurring in a location within the video file, the "hotter" (or more prominent) the graphical representation will be. In one embodiment, the heat map may look similar to a histogram or a bar graph. One benefit of such a heat map is that significant portions of a video are easily identifiable. The significance is with regard to the concentration of highly ranked and highly important words relative to the overall context of the video file. Such heat maps can be used to make additional determinations about a video file, which will be discussed below.

Figure 3:
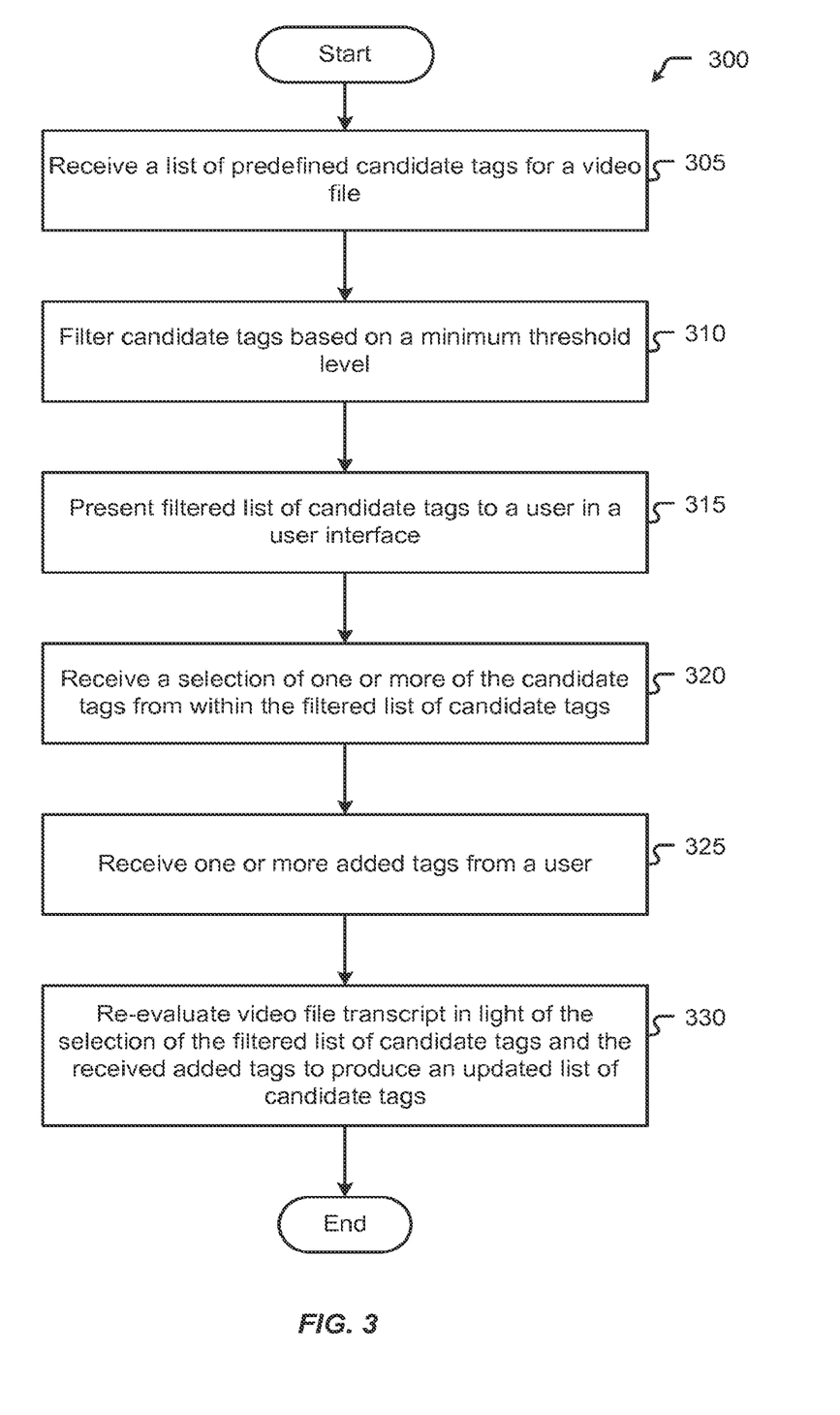
FIG. 3 shows a method of providing top concepts for a video file.

Turning next to FIG. 3, a method 300 of providing top concepts for a video file is shown. In one embodiment, a top concept may be a categorical determination of the content of the video file; however, other definitions may be used. At process block 305, a list of predefined candidate tags for a video file may be received. In one embodiment, the candidate tags may be generated based on techniques discussed with regard to methods 100 and 200, or any of the methods or techniques discussed herein, or as known to one skilled in the art.

In one embodiment, a first pass filtering may be done to determine if the list of predefined tags meets a minimum threshold (process block 310). In one embodiment, the minimum threshold may include determining the ranking of the words and concepts which were used as the basis of the tag, and if the rankings are sufficiently low, the predefined tag may be excluded as falling below the threshold. One possible method of determining a minimum threshold score may be setting a number based on empirical observation of how well predefined concepts score against existing videos in, for example, a training set.

Accordingly, at process block 315, the filtered list may be presented to a user in a user interface. One or more of the filtered predefined tags may be reviewed by the user and a selection of candidate tags may be received (process block 320). In one embodiment, the user may not select any of the predefined filtered tags and provide their own tags (process block 325), or alternately the user may request that steps 305-315 be re-run to produce better predefined tags.

At process block 330, the video file transcript may be re-evaluated in light of the selections from the predefined filtered list of candidate tags. Furthermore, based on the re-evaluation, an updated list of tags may be produced, which would represent the top concepts for the video file. Furthermore, the updated list of tags may then be re-run through method 300 to further fine tune the top concepts for the video file. Accordingly, based at least in part on the identified top concepts for the video file, relationships between video files may be made based on corresponding top concepts.

Figure 4A:
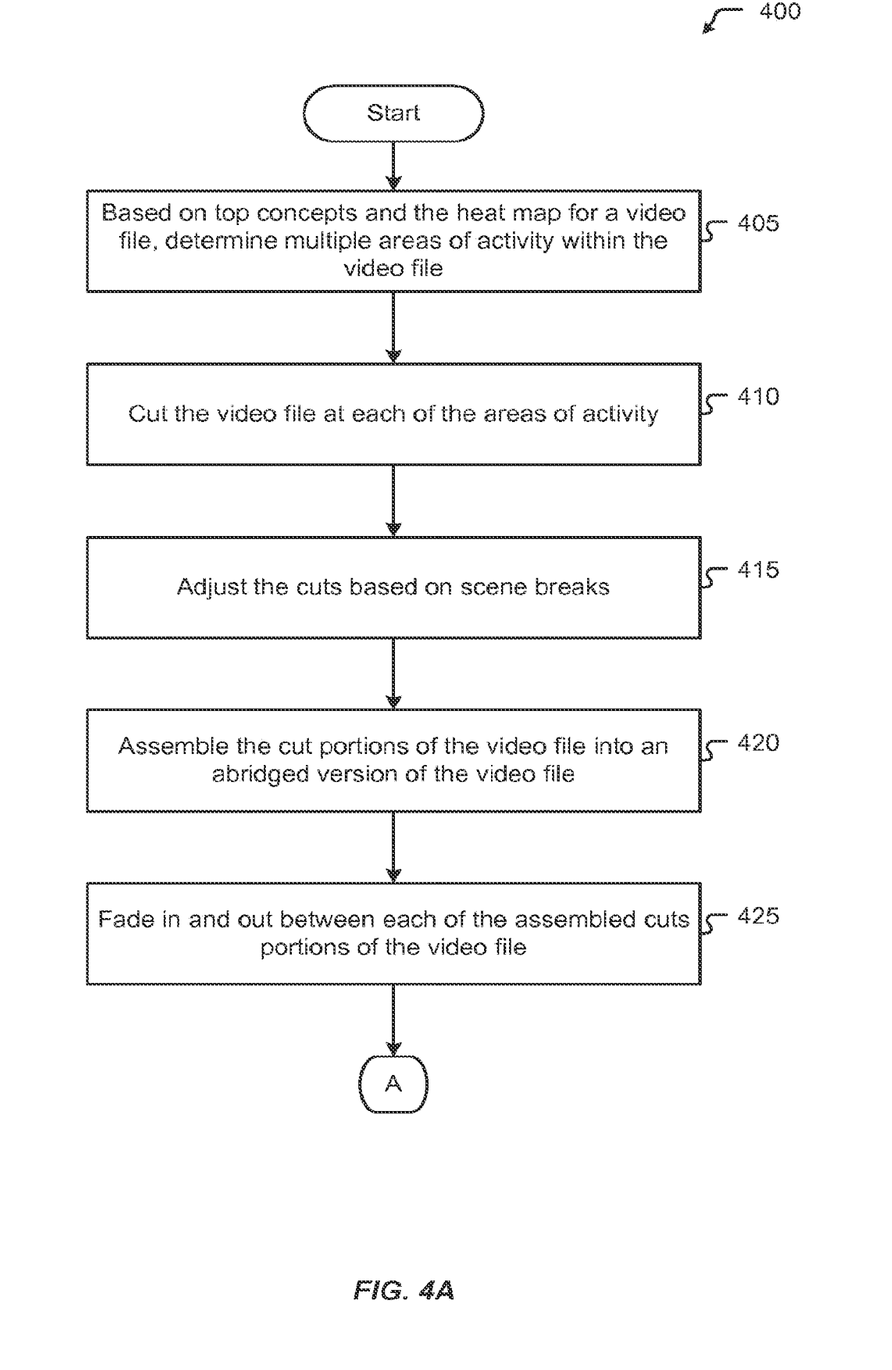
FIGS. 4A and 4B show methods of abridging video files.
Figure 4B:
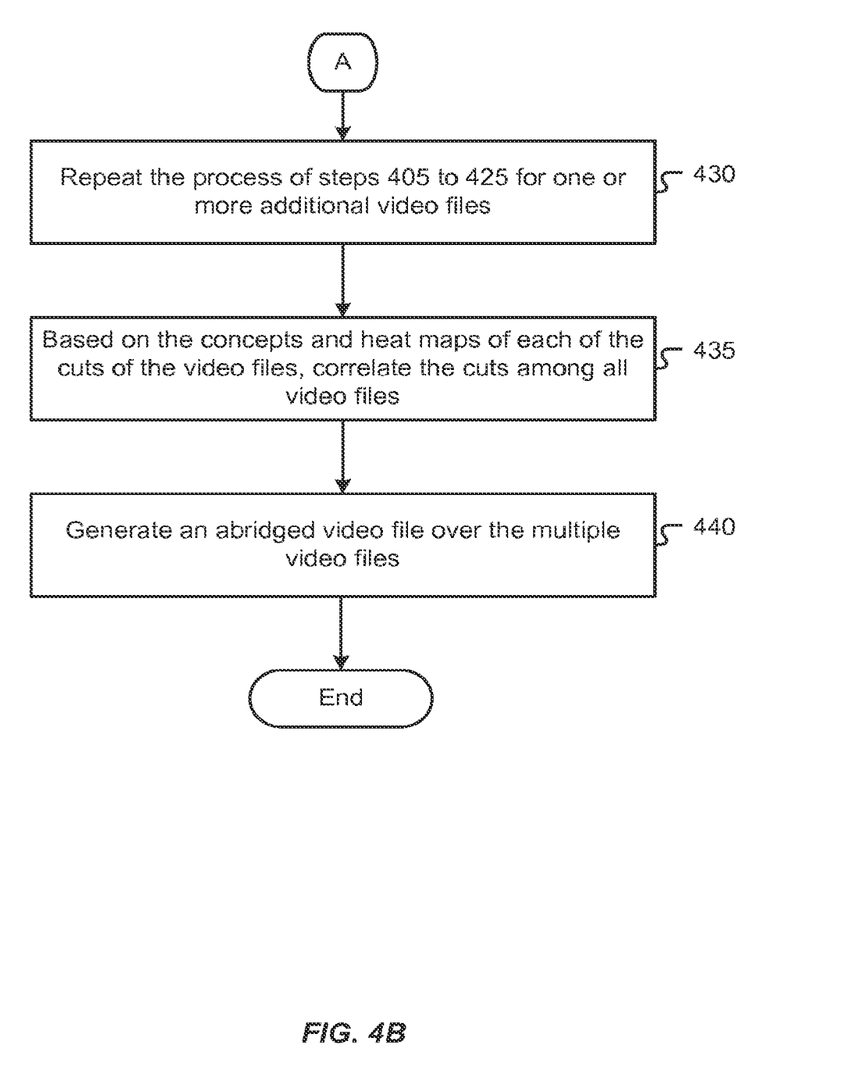

Referring now to FIGS. 4A and 4B, a method 400 of abridging video files is shown. At process block 405, utilizing words rankings, the heat map, and/or top concepts for a video file, or multiple "areas of activity" within the video may be determined. In one embodiment, an area of activity may include sections of the video where a high concentration of highly ranked words, words which relate to top concepts, or very "hot" portions of the video as determined from the heat map. In other words, these areas of activity include sections of the video which from a substantive context include the most relevant portions of the video.

Hence, at process block 410, the video may be "cut" at the beginning and end of each of these areas of activity. In one embodiment, cut may mean pulling out the section of the video represented by the time offsets of each area of activity. Accordingly, the video may now be represented by several smaller clips having the most activity (or having the most important content for the video). In one embodiment, the cuts (or sections of the video) may be adjusted based on known scene cuts, chapter cuts, etc. (process block 415).

At process block 420, the cut portions of the video may be assembled into an abridged version of the video, with fading in an out at the cut points (process block 425). Accordingly, the abridged version of the video may only include the substantively significant portions of the entire video.

Continuing at point "A" of method 401, at process block 430, the process of steps 405-425 may be repeated for additional related video files. Then, based on the top concepts, word ranking, and heat maps of the collective videos, a correlation of cuts among all videos may be created (process block 435). As such, an abridged video file over multiple related videos may be generated (process block 440). For example, a sports highlight reel may be automatically generated by abridging related videos (e.g. basketball game clips) into a continuous video of one exceptional play after another. Part of the rationale behind the cuts finding the highlights is that most of the substantive dialog (or dialog related to exceptional play) would occur in an "area of activity", which would be determined by the process or method 400.

Figure 5:
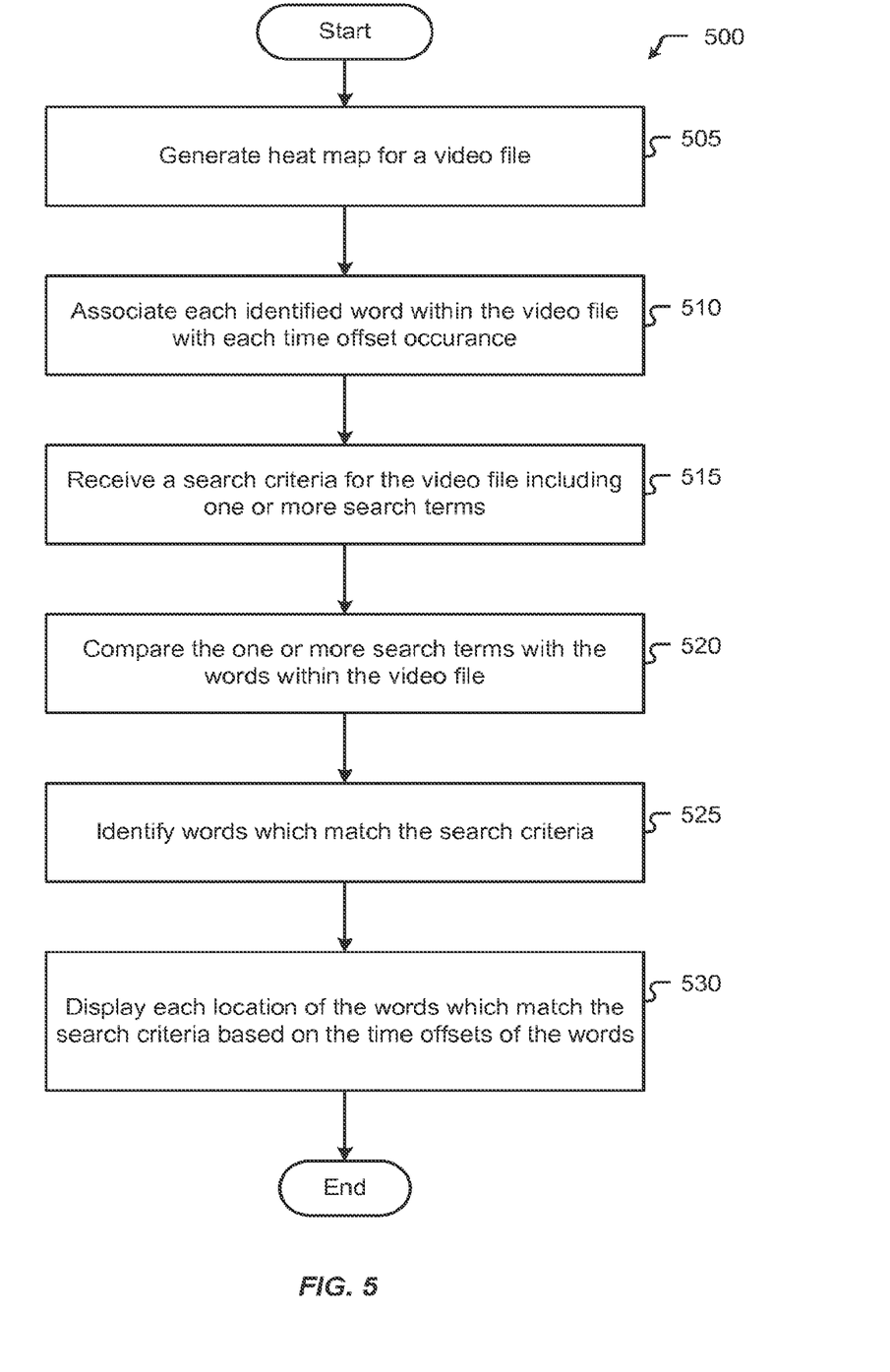
FIG. 5 shows a method of providing in-video search mechanisms.

Turning now to FIG. 5, a method 500 of providing in-video search mechanisms is shown. At process block 505, a heat map in accordance with embodiments of the present invention may be generated. At process block 510, a time offset occurrence may be associated with each identified word within the video. In one embodiment, a word time offset mapping may be generated which may include each determined word and one or more time locations within the video of the word's occurrence.

At process block 515, a search box or the like may be presented to a user, and the user may enter one or more search terms. In one embodiment, the search box may be a pop-up box which acts the same or similarly to a "control-f" search box. As such, a user may be provided with a view of a video in a video player and, when the video is selected, the user can activate a search box, or alternatively the search box may be embedded near the video player.

Furthermore, at process block 520, the words from the video file may be compared with the search terms to find word matches within the video file based on the search terms. Accordingly, a word or a number of words are identified which match the search criteria (process block 525). Then, based on the time offsets of each occurrence of the word or words, a graphical representation of each occurrence may be displayed relative to the time bar of the video player for the video (process block 530). For example, if the video is 3 minutes long and the search term is "touchdown", and "touchdown" occurs 1 minute, 2 minutes, and 2 minutes and 30 seconds into the video, then a graphical representation would be placed are each location respectively. As such, in this example a graphical designation (e.g., a bar, a line, etc.) would be placed approximately ⅓ of the way down the time bar, ⅔ of the way down the time bar, and ⅚ of the way down the time bar.

Furthermore, the user would be able to move through the occurrences by clicking on a next button or pressing a key configuration to jump through the term locations. Also, as each occurrence is jumped to, the playback of the video may be set to correspond to the location of the occurrence. In a further embodiment, multiple videos may be searched together, such that the search terms found in multiple videos may be marked, and the user is able to cycle through the occurrences over the multiple videos.

In a further embodiment of the present invention, the methods described herein may be used to provide a collaborative view of related content. For example, a search may provide multiple related videos, blogs, web pages, text documents, news articles, etc. and present them in a single page view. In one embodiment, a widget or the like may be embedded in a web page which based on a search criteria crawls the Internet (or other network) to provide a centralized view of all related content in a single view.

Figure 6:
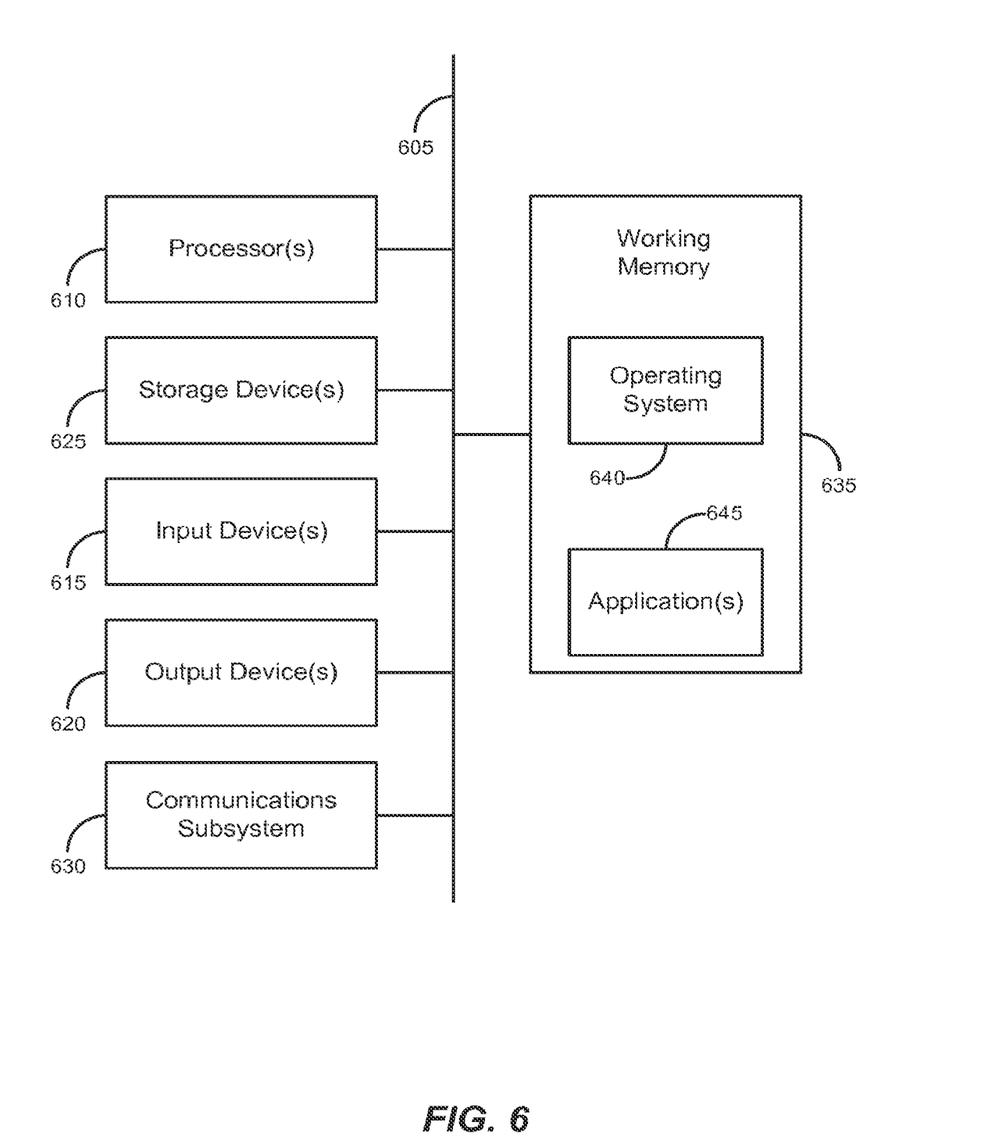
FIG. 6 shows an embodiment of a computer system.

FIG. 6 provides a schematic illustration of one embodiment of a computer system 600 that can perform the methods of the invention, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including without limitation, one or more general purpose processors and/or one or more special purpose processors (such as digital signal processing chips, graphics acceleration chips, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more storage devices 625, which can comprise without limitation local and/or network accessible storage and/or can include without limitation a disk drive, a drive array, an optical storage device, a solid state storage device such as a random access memory ("RAM"), and/or a read-only memory ("ROM"), which can be programmable, flash updateable, and/or the like. The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640 and/or other code, such as one or more application programs 645, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code. In one embodiment, the computer or machine-readable medium may be non-transitory.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation, dynamic memory, such as the working memory 635. Transmission media includes coaxial cables, copper wire, and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 610 retrieves and executes the instructions. The instructions received by the working memory 635 may optionally be stored on a storage device 625 either before or after execution by the processor(s) 610.

As will be understood by those skilled in the art, the present invention may be embodied in other specific forms. One particular embodiment of the partial object cache, as previously described, can be associated with a plurality of versions of programming structures. Those skilled in the art will recognize, or be able to ascertain using no more than routine experimentation, many equivalents to the specific embodiments of the invention described herein. Such equivalents are intended to be encompassed by the following claims.

What is claimed is:

1. A computer-implemented method of generating automated tags for a video file, the method comprising:
   receiving a list of candidate tags for a video file;
   receiving a transcript of audio associated with the video file;
   evaluating the transcript of audio associated with the video file;
   ranking the list of the candidate tags for the video file based on a plurality of ranking factors, wherein
      ranking the list of the candidate tags for the video file based on the plurality of ranking factors includes ranking the list of the candidate tags based on the evaluated transcript;
   associating a rank with each of the candidate tags in the list of the candidate tags, based on the ranking;
   forming a filtered list of the candidate tags by removing ones of the candidate tags from the list of the candidate tags, the ones of the candidate tags that are removed having an associated rank that is below a threshold value, wherein
      evaluating the transcript comprises generating a list of top concepts for the video file in light of the selection of one or more of the filtered list of the candidate tags;
   establishing a relationship between the video file and at least one other video file based on corresponding top concepts between the video file and the at least one other video file;
   presenting the filtered list of the candidate tags in a user interface;
   receiving a selection of one or more of the filtered list of the candidate tags from the user interface; and
   producing an updated list of the candidate tags for the video file, based on the selection.

2. The computer-implemented method of generating automated tags for a video file as in claim 1, wherein presenting the filtered list of the candidate tags comprises:
   generating a heat map for the video file, wherein the heat map comprises a graphical display that indicates offset locations of words within the video file with the highest associated rank; and
   presenting the heat map in the user interface.

3. The computer-implemented method of generating automated tags for a video file as in claim 2, wherein presenting the heat map in the user interface is concurrent with presenting the filtered list of the candidate tags in the user interface.

4. The computer-implemented method of generating automated tags for a video file as in claim 1, wherein the plurality of ranking factors comprises a term frequency-inverse document frequency score of words in the transcript that are associated with the candidate tags.

5. The computer-implemented method of generating automated tags for a video file as in claim 1, wherein the plurality of ranking factors comprises relative volume of a word in context of the video file.

6. The computer-implemented method of generating automated tags for a video file as in claim 1, wherein the plurality of ranking factors comprises distribution of a word within the transcript.

7. The computer-implemented method of generating automated tags for a video file as in claim 1, wherein the plurality of ranking factors comprises finding a word that is related to a ranked word within the transcript.

8. The computer-implemented method of generating automated tags for a video file as in claim 1, further comprising repeating the steps of ranking, associating, filtering, presenting, receiving a selection of one or more of the filtered list of the candidate tags, evaluating, and producing the updated list, to fine tune the list of scored top concepts.

9. The computer-implemented method of generating automated tags for a video file as in claim 1, further comprising providing one or more suggested video files associated with the video file based on the relationship between the video file and the at least one other video file.

10. A system that generates tags for a video file, comprising:
one or more processors;
a storage device that includes a non-transitory, computer-readable storage medium;
a communications subsystem; and
a user interface including at least one input device and at least one graphical display;
wherein the storage medium stores the video file and instructions that, when executed by the one or more processors, cause the system to perform operations including:
receiving a list of candidate tags for the video file through the communications subsystem;
receiving a transcript of audio associated with the video file;
evaluating the transcript of audio associated with the video file;
ranking the list of the candidate tags for the video file based on a plurality of ranking factors, wherein:
ranking the list of candidate tags for the video file based on the plurality of ranking factors include ranking the list of candidate tags based on the evaluated transcript;
associating a rank with each of the candidate tags in the list of the candidate tags, based on the ranking;
forming a filtered list of the candidate tags by removing ones of the candidate tags having an associated rank that is below a threshold value from the list of the candidate tags, wherein:
evaluating the transcript cause the system includes generating a list of top concepts for the video file in light of the selection of one or more of the filtered list of candidate tags;
establishing a relationship between the video file and at least one other video file based on corresponding top concepts between the video file and the at least one other video file;
presenting the filtered list of the candidate tags in the user interface;
receiving a selection of one or more of the filtered list of the candidate tags from the user interface;
producing an updated list of the candidate tags for the video file based on the selection; and
storing the updated list of the candidate tags associated with the video file in the storage medium.

11. The system that generates tags for a video file as in claim 10, the storage medium storing additional instructions that, when executed by the one or more processors, cause the system to perform operations including:
generating a heat map for the video file, wherein the heat map comprises a graphical display that indicates offset locations of words within the video file with the highest rankings;
presenting the heat map in the user interface;
receiving a selection of one or more of the filtered list of the candidate tags from the user interface; and
producing an updated list of the candidate tags for the video file, based on the selection.

12. The system that generates tags for a video file as in claim 11, the additional instructions causing the system to present the filtered list of the candidate tags, and the heat map, concurrently in the user interface.

13. The system that generates tags for a video file as in claim 10, the storage medium storing additional instructions that, when executed by the one or more processors, cause the system to perform operations including:
providing one or more suggested video files associated with the video file based on the relationship between the video file and the at least one other video file.

14. A computer-implemented method of generating automated tags for a video file, the method comprising:
generating a targeted transcript of the video file, wherein the targeted transcript includes a plurality of words;
generating an ontology of the plurality of words based on the targeted transcript;
ranking the plurality of words in the ontology based on a plurality of scoring factors;
based on the ranking of the plurality of words, generating one or more automated tags associated with the video file;
generating a list of top concepts for the video file in light of the one or more automated tags associated with the video file;
establishing a relationship between the video file and at least one other video file based on corresponding top concepts between the video file and the at least one other video file; and
generating a heat map for the video file, wherein the heat map comprises a graphical display that indicates offset locations of words within the video file with the highest rankings.

15. The computer-implemented method of generating automated tags for a video file as in claim 14, further comprising:
presenting the heat map in a user interface;
receiving a selection of one or more of the filtered list of the candidate tags from the user interface; and
producing an updated list of the candidate tags for the video file, based on the selection.

16. The computer-implemented method of generating automated tags for a video file as in claim 14, wherein ranking the plurality of words in the ontology is based on scoring factors that include one or more of:
distribution of words within the targeted transcript of the video file,
words related to the plurality of words within the targeted transcript of the video file, occurrence age of the related words,
vernacular meaning of the plurality of words, or colloquial considerations of the meaning of the plurality of words,
frequency of words and
proximity of words relative to other words.

17. The computer-implemented method of generating automated tags for a video file as in claim 14, further comprising determining a score for each of the plurality of words, wherein the score is based on word frequency, word distribution, and word variety.

18. The computer-implemented method of generating automated tags for a video file as in claim 14, further comprising cross-referencing words with the plurality of words to determine correlations between words or to construct phrases, wherein the cross-referencing of the word or words is configured to increase the ranking of the word or words.

19. The computer-implemented method of generating automated tags for a video file as in claim 14, further comprising providing one or more suggested video files associated with the video file based on the relationship between the video file and the at least one other video file.

\* \* \* \* \*